United States Patent [19]

Green

[11] Patent Number: 5,733,643
[45] Date of Patent: Mar. 31, 1998

[54] PHYSICAL BARRIER COMPOSITE MATERIAL

[75] Inventor: Philip W. Green, Miami, Fla.

[73] Assignee: P.G. Products, Inc., Miami, Fla.

[21] Appl. No.: 540,847

[22] Filed: Oct. 11, 1995

[51] Int. Cl.$^6$ .................................................. B32B 7/02
[52] U.S. Cl. .................................................. 428/217; 442/239
[58] Field of Search ............................ 428/217; 442/239

[56] References Cited

U.S. PATENT DOCUMENTS 5,480,705   1/1996   Tolliver et al. .................... 428/217

*Primary Examiner*—Christopher Raimund
*Attorney, Agent, or Firm*—Robert M. Downey, PA

[57] ABSTRACT

A composite barrier material is disclosed. The barrier material includes a first layer including a polymer resin in an amount of at least 40% by weight of the first layer and defining a first matrix, and a second layer integrally bonded to the first layer and including a polymer resin in an amount of at least 40% by weight of the second layer and defining a second matrix. The polymer resin of the first matrix has a different chemical structure than the polymer resin of the second matrix and the second layer has a cured hardness greater than the first layer. The shear bond strength of the barrier material is at least equal to the shear bond strength of a similar single matrix laminate comprising first and second layers of the same matrix material.

17 Claims, 1 Drawing Sheet

PHYSICAL BARRIER COMPOSITE MATERIAL

BACKGROUND OF THE INVENTION

1. Field of the Invention

The present invention relates to barrier materials and, more specifically, to a composite barrier material structured to resist impact and penetration from an object or projectile including bullets, fragments from explosions, sharp instruments such as knives, ice picks and the like, and blunt instruments such as bats, hammers, iron bars and the like.

2. Description of the Related Art

Barrier materials to protect people or facilities against trauma and assaults of the type resulting from firearms, explosive blasts, sharp instruments, and/or blunt instruments have been used for many years and applied in various forms. For instance, metals, and particularly steel, have been used as a barrier material in numerous applications. While metals, and especially steel, are extremely effective in resisting impact and penetration against trauma and assaults of the type described above, metals suffer from the disadvantages associated with their high density and difficulty in cutting, forming and fitting to a variety of shapes for specific needs. Additionally, projectiles such as bullets will deflect or ricochet off metal and present a threat to bystanders or other parts of one's body if used for body armor.

In recent years, several new materials have been developed to provide an improvement over the traditional steel or metal based products. The most significant of these new materials are polyethylene and para-aramid based fibers woven into fabric, alumina and boron carbide based cast ceramic materials and polycarbonate based plastics. While these materials are certainly lighter than most metals, they have numerous drawbacks associated with them. In particular, these materials are all quite expensive in comparison to steel or other metals. Further, fabrics woven from para-aramid based or polyethylene fibers are ineffective against assaults by sharp instruments such as knives, ice picks, screwdrivers and the like. Further, para-aramid based and polyethylene fibers are sensitive to light, moisture, and heat, rendering them ineffective under commonly encountered environmental conditions.

Other composite materials have been developed wherein typically some reinforcing materials have been bonded together, usually under high pressure and/or temperature, to produce a single matrix, multi-layered material. These materials typically have a low matrix component of generally 20%–25% of the total weight of the material. Further, these materials have limited effectiveness, in part due to their monolithic single matrix construction, and also their low matrix content caused by the high pressure manufacturing process, which has the effect of squeezing out the matrix during the process. Further, the high cost of the required process equipment and the great cost and difficulty of molding curved or compound curved parts, makes these materials relatively cost prohibitive.

SUMMARY OF THE INVENTION

In accordance with the present invention, there is provided a composite barrier material comprising stratas or layers of polymer resin matrices, each of a different chemical structure. Each of the layers includes woven fabric layers, or other suitable filler material such as low micron silica flour, suspended therein. The polymer resin matrices constitute a very high percentage of the overall material, generally 40% to 50% by weight. This high content of polymer resin allows the resin to infiltrate completely the woven fabric (or fill material) which lies wholly suspended within the polymer resin matrix.

In a preferred embodiment, the composite barrier material comprises two or more layers making up at least one matrix, each of which comprises an impact resistant polymer resin having a woven fabric suspended therein, wherein the polymer resin constitutes at least 40% by weight of each layer. The individual layers, or series of such layers, may have the same physical characteristics for one matrix, or different physical characteristics to define two matrices.

In one preferred embodiment of the invention, the barrier material is comprised of two adjoining layers of polymer resins having a different chemical structure, each defining a matrix. The hardness of one matrix, comprising one or more layers, being less than that of the adjoining matrix. In use, the layer or matrix of greater hardness will be presented to receive impact from a bullet, explosive fragment, sharp instrument, or other object striking the barrier material. The harder matrix layer is more effective than a comparable softer layer in changing or distorting the shape of the striking object, and/or turning the projectile or object in such a manner so as to increase its profile or surface area relative to the plane of the layers. This has the effect of increasing the drag or resistance of the object and, therefore, causing it to decelerate more rapidly. Accordingly, the ability of the object to penetrate the material is significantly lessened.

The less hard matrix layer, behind the harder matrix system, gives the barrier material flexibility, and increases its shock absorbency and ability to halt the impact and force of penetration of the object without significant disruption or structural damage to the surrounding material structure. In this manner, the integrity and strength of the material is retained, enabling the material to withstand numerous close proximity subsequent impacts.

Each matrix may comprise one or more layers of a polymer resin having the same chemical structure; and each layer may include the woven fabric or other material suspended therein. The number of layers in each matrix system, and the particular polymer resin and fill materials used for each layer of the matrix will vary in accordance with ballistic threat categories and the intended use of the material.

The process application, whereby two or more consecutive layers of the barrier material are of a different chemical structure and are cast, poured, or applied in a continuous manufacturing process in direct contact with each other is an important feature of the present invention. In bonding the two or more layers, it is essential that the resultant by-component laminate have a shear bond strength equal to that of a single matrix laminate in order to retain its barrier integrity and structural strength under severe impact stress.

In accordance with the process of the present invention, the isolation of two or more incompatible chemical structures of two polymer types is accomplished by the application of a cobalt octoate salt in solution in a volatile solvent base, such as acetone. The salt, in the volatile solvent base, is applied over the surface of one of the polymer resin layers. Once applied, the volatile solvent base quickly evaporates, and the cobalt salt which remains in deposit has the effect of radically accelerating the chemical cure of the contacting polymer resin surface. The result is a stable surface film where cross-linking has been radically accelerated. This enables a second polymer resin of a completely different chemical structure to be applied to the first layer. The stable surface film, resulting from the accelerated reaction to the cobalt salt, isolates the chemically different polymer resins of the first and second layers, preventing interaction between the two layers. In this manner, the two, chemically different polymer resins do not interfere with one another, as each is independently undergoing an active and dissimilar cross-linking process to cure. Accordingly, with the foregoing in mind, it is a primary object of the present invention to provide a cost-effective fabricated composite barrier material which is specifically structured to resist impact and penetration of projectiles, sharp instruments, and/or blunt instruments.

It is a further object of the present invention to provide a composite barrier material comprising multiple diverse polymer resin layers applied during a continuous and economical manufacturing process.

It is still a further object of the present invention to provide a composite barrier material which comprises two or more polymer resin layers, each of a different chemical structure, wherein the polymer resin layers are bonded to form an integral, laminated structured in a continuous manufacturing process through the use of a cure accelerating agent to prevent interaction of the two polymer resins while each is undergoing a cross-linking process.

It is still a further object of the present invention to provide a composite barrier material comprising one or more layers of a polymer resin, wherein each of the layers includes a filler material suspended within the polymer resin to provide added hardness, resiliency, and structural strength.

It is yet a further object of the present invention to provide a composite barrier material comprising one or more layers, wherein each layer includes a polymer resin material in an amount of at least 40% by weight of the layer.

It is still a further object of the present invention to provide a composite barrier material comprising at least a first layer formed of an extremely hard phenol epoxy resin and a second layer formed of a softer relatively flexible and resilient polyester based polymer resin.

It is still a further object of the present invention to provide a composite barrier having contiguous multiple layers of polymer materials with totally different chemical structures in order to more effectively distort, slow and eventually stop a projectile object before complete penetration through the material.

It is still a further object of the present invention to provide a composite barrier material, as described above, further including aluminum oxide or other high density ceramic segmented tiles bonded to an exterior surface of the polymer resin layer using a highly flexible polyurethane based polymer to provide improved high impact resistance which allows close proximity impacts without affecting the integrity of the surrounding material structure.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Referring to the several figures of the drawings, there is illustrated various embodiments of the composite barrier material of the present invention, generally referred to as 1.

In each of the embodiments, the composite barrier material 1 consists of at least one layer which includes an impact resistant polymer resin in an amount of at least 40% by weight of the layer. In the preferred embodiments, the polymer resin is present in an amount of between 40–50% by weight of each layer. The embodiments shown in FIGS. 1 and 3 all include a plurality of layers bonded together to form a coherent structure. Each layer further includes a woven fabric embedded therein to provide increased hardness, resiliency and resistance to penetration.

Figure 1:
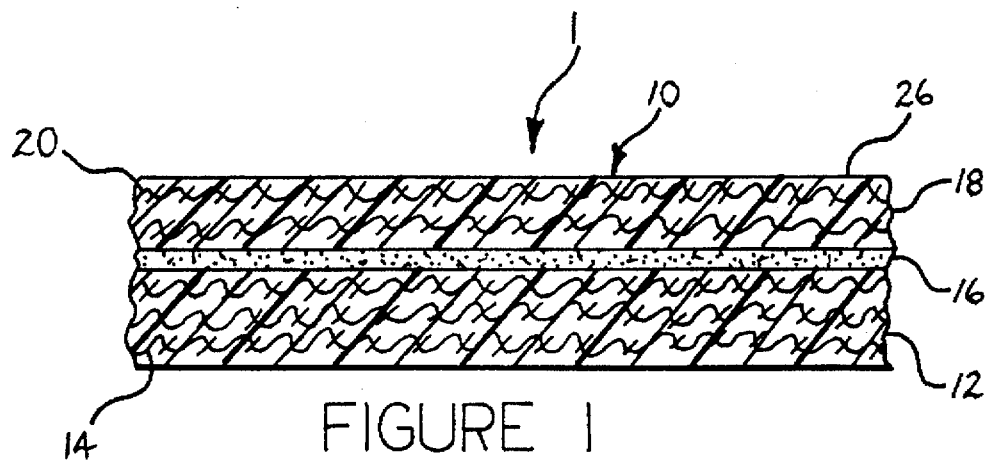
FIG. 1 is a sectional view illustrating a first preferred embodiment of the composite barrier material of the present invention.
Figure 2:
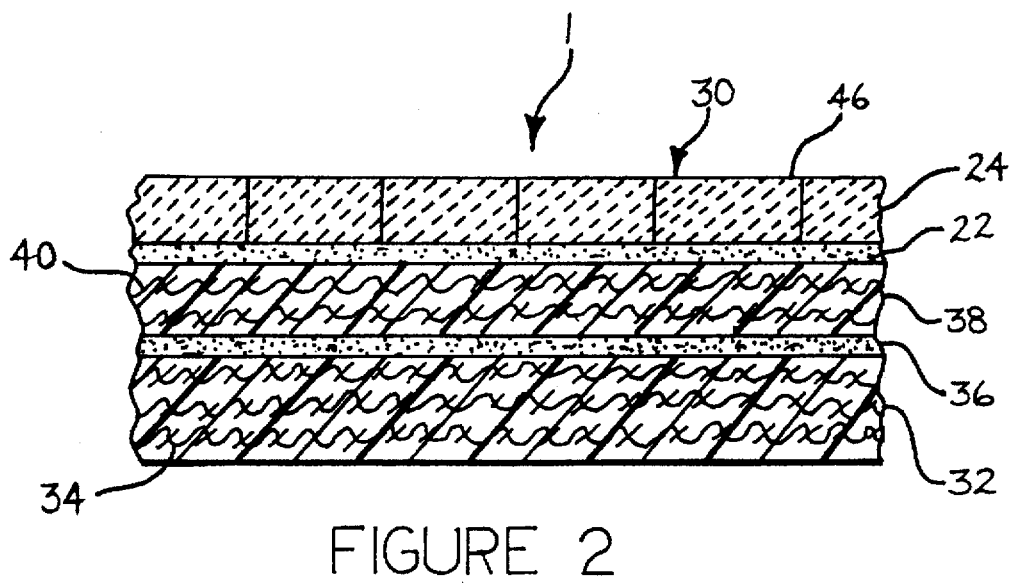
FIG. 2 is a sectional view of a second preferred embodiment of the composite barrier material including a segmented aluminum oxide ceramic tile layer.
Figure 3:
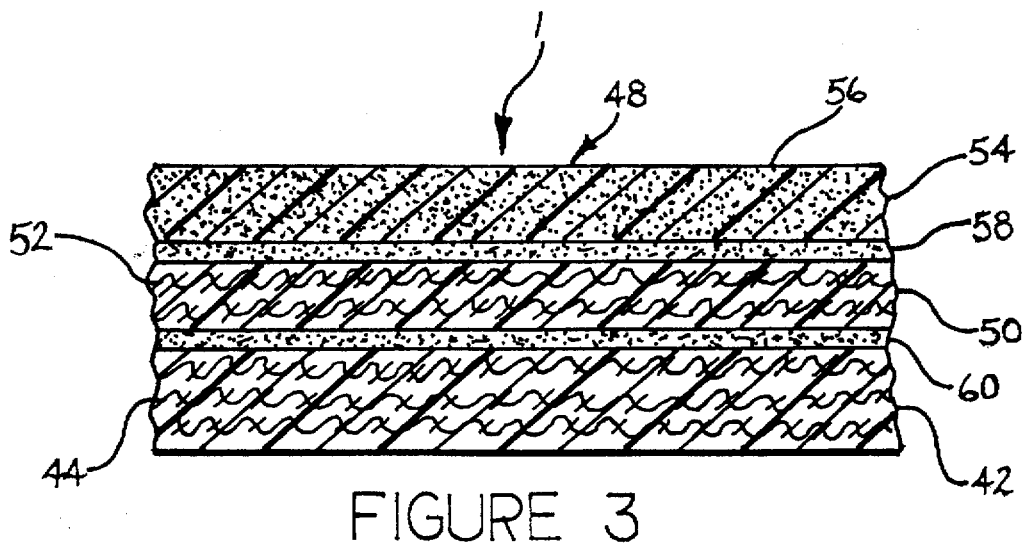
FIG. 3 is a sectional view illustrating a third preferred embodiment of the composite barrier material of the present invention.

In the embodiments shown in FIGS. 1–3, each layer consists of an impact resistant polymer resin of a different chemical structure. The manufacturing process of the material 1, whereby two or more consecutive layers of different chemical structure are cast, poured, or applied in a continuous, systematic operation is an important aspect of the invention, as the resultant by-component laminate structure of the material 1 must have a shear bond strength equal to that of a equal single matrix laminate in order to retain its barrier integrity and structural strength under severe impact stress. This unique temporary isolation of the incompatible chemistries of the two polymer types is accomplished by the application of a cobalt octoate salt. The cobalt salt is first mixed in a solution including a volatile solvent base. Once the exposed surface of the first layer has been laid down, the solution containing the cobalt salt is applied to the exposed surface. Application in a solution form ensures complete and uniform dispersal of the cobalt salt across the entire exposed surface of the first layer. After application of the solution, the volatile solvent base quickly evaporates. The cobalt salt, remaining in deposit on the surface, has the effect of radically accelerating the chemical cure of the exposed surface of the polymer resin layer. In this manner, the next layer comprising a polymer resin of a different chemical structure can be applied directly in contact with the first layer. The stable surface film on the surface of the first layer, where crosslinking has been accelerated by the cobalt salt, does not interact with the highly active chemical reaction taking place within the subsequently applied layer, thus not interfering with its active cross-linking process.

The woven fabric used as internal reinforcement within the layers of the material 1, may be made of any suitable fiber. Examples of fabrics of suitable fibers are E or S type glass fibers, para-aramid based fibers, nylon based fibers, and polyethylene fibers. Fabric of long strand E glass fiber are particularly useful due to its relatively low cost. The woven fabric which is preferred is one wherein the warp and weft or cross-directional weave ratio of the fiber is substantially the same, ensuring equal strengths in both directions across the fabric face, as well as the point where the strands cross in the weave. Use of a heavy long strand straight weave reinforcing cloth in excess of 800 grams per square meter, wherein the reinforcing cloth is present in an amount of approximately 50% by weight of the layer, is preferred. In this manner, the ratio of the weight of the polymer resin matrix to the weight of the reinforcing cloth is 50:50.

A further preferred form of the polymer matrices utilized in the manufacture of the composite barrier material 1 utilizes other materials such as particulate fillers to be included in one or more of the polymer resin matrix layers. This additive component to the matrix layer modifies the physical and performance characteristics of the polymer, imparting far greater hardness and tenacity to the material than would be possible alone. An example of a suitable particular filler is low micron silica flour. Such fillers improve both the hardness and impact resistance of the polymer resin matrix; contributing to the strength of the material 1.

The polymer resin matrix of each layer will typically be cross-linked polymers, cured in the presence of a chemical catalyst which triggers the cross-linking process. Examples of such polymers are polyester polymers, such as an isophthalic polyester polymer, and epoxy polymers, such as a phenol epoxy polymer. These polymers are all cured to a hard form in the presence of a catalyst normally under ambient air pressure and temperature conditions, and without the need for high pressure and/or temperature to activate the curing process.

The three preferred embodiments of the present invention will now be described with reference to the accompanying drawings, FIGS. 1–3.

Referring initially to FIG. 1, there is illustrated a first preferred embodiment of the composite barrier material 1, generally referred to as 10. The barrier material 10 includes a plurality of layers bonded together to form a coherent, integral structure. Layer 12 is comprised of an impact resistant, relatively flexible isophthalic polyester resin having a woven fabric 14 of glass fiber embedded therein. Layer 16 is a cobalt salt conditioning layer, used to accelerate the curing of a top surface of a first layer 12, as described above. Layer 18 consists of a phenol epoxy based resin having a woven fabric 20 of glass fiber embedded therein. In use, the surface 26 will be presented in impact receiving relation to an assault or trauma by a projectile or other object.

The process of manufacturing the material of the various embodiments of FIGS. 1–3, and particularly the bonding of the chemically different polymer resin matrices of each layer, is generally the same for each embodiment. Therefore, while the following is a description of the manufacturing process of the barrier material 10 of FIG. 1, the same process applies to the bonding of the polymer resin matrices of the embodiments of FIGS. 2 and 3.

The barrier material 10, of FIG. 1, is made by first laying the fabric 14 flat on a surface, mold, or form, and thereafter applying the polyester based polymer in uncured, liquid form, over the fabric. The polyester based polymer should be applied and spread so that the fabric becomes fully saturated and suspended within the spread layer. If desired, a second layer of fabric, and subsequent layers of polymer resin can be applied, wherein the layer or layers of the polyester based polymer define a first matrix. Thereafter, the layer 16, containing the cobalt salt in solution form, is systematically applied to the top surface of the layer 12, or uppermost layer of the first matrix. The cobalt salt, after evaporation of the solvent, causes an extremely thin surface portion of the layer 12 to cure rapidly to a chemically stable form. With this surface in its stable form, it is possible to apply the layer 18. This is done by first placing the fabric 20 on the layer 16 and, thereafter, pouring the phenol epoxy polymer, in uncured liquid form, over the fabric, using physical manipulation to spread the phenol epoxy polymer over the fabric so that the fabric is fully surrounded and saturated. If desired, another layer of fabric, and subsequent layers of polymer resin can be applied in a similar manner, repeating the process to define a second matrix. After the desired layered structure is achieved, the composite barrier material 10 is allowed to set and cure, as each polymer resin matrix undergoes its own internal chemical cross-linking process.

FIG. 2 illustrates a second embodiment of the invention. Referring to this figure, a barrier material 30 comprises a number of layers bonded together to form a coherent structure. Layer 32 consists of an impact resistant, relatively flexible polyester resin having a woven fabric 34 of glass fiber embedded therein. Layer 36 consists of a cobalt salt conditioner, as described above. Layer 38 consists of a hard phenol epoxy resin having a woven fabric 40 of glass fiber embedded therein. In use, the surface 46 will be presented in impact receiving relation to an assault or trauma by a projectile or other object. The barrier material 30 is made in a similar manner to that described for the embodiment of FIG. 1. Layer 22 consists of a polyurethane polymer and layer 24 consists of a plurality of aluminum oxide or other ceramic tiles.

The use of aluminum oxide ceramic tiles or another impact resistant material provides an additional layer of impact resistance to the composite barrier material 30. In particular, aluminum oxide ceramic tiles, or other like impact resistant materials, are extremely effective against "armor piercing" projectiles. The process by which these tiles are attached is critical to the function of this embodiment of the invention, as massive disruptive forces are expected and often encountered in a localized area from high impact projectiles. It is critical that the adjacent tiles to the immediate impact area are not dislodged or loosened. The adjacent tiles must remain in tact to prevent a failure of the barrier's protection in the event of another impact in the same proximity. In the preferred embodiment, as illustrated in FIG. 2, a highly flexible, extremely strong bonding and rapid setting polyurethane based adhesive, such as Sika255FC, is used. This adhesive is uniquely suited to provide both the required flexibility and bonding strength between the ceramic and exposed polymer surfaces of the barrier material 30, which is essential when subjected to extreme stress.

Referring to FIG. 3, there is illustrated a third embodiment of the composite barrier material 1 of the invention. In this particular embodiment, a barrier material 48 comprises a number of layers bonded together to form a coherent structure. Layer 42 consists of an impact resistant, relatively flexible isophthalic polyester resin having a woven fabric 44 of glass fiber embedded therein. Layer 50 consists of a hard phenol epoxy resin having a woven fabric 52 of glass fiber embedded therein. A rigid isophthalic polyester resin layer 54 is filled with silica and is separated from the layer 50 by a cobalt salt conditioner 58. The silica is preferably present in an amount of approximately 70% by weight of the rigid layer 54. Similarly, the relatively flexible layer 42 is separated from layer 50 by a cobalt salt conditioner layer 60, the purpose of which has been set forth above. The barrier material 48 is made in a manner similar to that described for the embodiments of FIGS. 1 and 2. The substitution of a rigid layer highly filled with silica allows for a very inexpensive alternative (approximately ⅕ of the cost) to ceramic tiles or other more costly impact resistant materials. It is to be noted that in all three embodiments (FIGS. 1–3), the respective layers 18, 38, and 50 each have a hardness which is greater than that of layers 12, 32, 42 respectively. Also, the cobalt salt conditioner layers 16, 36, 58, and 60 in the three embodiments may effectively be absorbed by one of the adjacent polymer resin layers during the curing of these layers.

In their various forms, the composite barrier materials of each of these embodiments is produced in accordance with the process as described above and each can be fabricated into many products. Specifically, the barrier material of each of the above described embodiments may be used to produce bullet and/or trauma resistant body armor, bullet resistant face masks, high impact and bullet resistant helmets, bullet and bomb resistant window units, bullet and sharp instrument resistant riot shields, and bullet and bomb resistant doors, walls and armored panels for the protection of motor vehicles, boats, aircraft, personnel, machinery, and sensitive equipment such as electronics and computers.

While the instant invention has been shown described in what is considered to be preferred and practical embodiments thereof, it is recognized that departures may be made within the spirit and scope of the invention as set forth in the following claims which, therefore, should not be limited except within the doctrine of equivalents.

Now that the invention has been described,

What is claimed is:

1. A barrier material comprising:

a first layer including a flexible isophthalic polyester resin in an amount of at least 40% of a total weight of said first layer and a woven fabric embedded therein, a second layer bonded to said first layer, said second layer including a phenol epoxy based resin in an amount of at least 40% of the total weight of said second layer and a woven fabric embedded therein, wherein said second layer has a hardness when cured which is greater than a hardness of said first layer when cured, and wherein the shear bond strength of the barrier material is at least equal to the shear bond strength of a similar single matrix laminate comprising first and second layers of the same matrix material.

2. A barrier material as recited in claim 1 wherein said first layer further includes a filler material to provide increased hardness and resiliency to said first layer.

3. A barrier material as recited in claim 2 wherein said second layer includes a filler material to provide increased hardness and resiliency to said second layer.

4. A barrier material as recited in claim 3 wherein said woven fabric in said first layer and said second layer is a straight weave reinforcing cloth.

5. A barrier material as recited in claim 4 wherein said straight weave reinforcing cloth has an areal density which is in excess of 800 grams per square meter.

6. A barrier material as recited in claim 5 wherein said straight weave reinforcing cloth is present in each of said first and second layers in an amount of at least 40% by weight of said respective first and second layers.

7. A barrier material as recited in claim 3 wherein said fill material of said second layer is silica flour.

8. A barrier material as recited in claim 1 further including a plurality of ceramic tiles bonded to a top surface of said second layer to provide an impact resistant layer structured to permit repeated impacts without comprising the integrity of said first and second layers.

9. A barrier material comprising:

a first layer including a polyester resin defining a first matrix and including a woven fabric embedded therein, a second layer bonded to said first layer and including a epoxy resin defining a second matrix and including a woven fabric embedded therein, wherein said second layer has a hardness when cured which is greater than a hardness of said first layer when cured, and wherein the shear bond strength of the barrier material is at least equal to the shear bond strength of a similar single matrix laminate comprising, first and second layers of the same material.

10. A barrier material as recited in claim 9 wherein said first layer further includes a filler material to provide increased hardness and resiliency to said first layer.

11. A barrier material as recited in claim 10 wherein said second layer includes a filler material to provide increased hardness and resiliency to said second layer.

12. A barrier material as recited in claim 11 wherein said filler material in said first layer and said second layer is a straight weave reinforcing cloth.

13. A barrier material as recited in claim 12 wherein said straight weave reinforcing cloth has an areal density which is in excess of 800 grams per square meter.

14. A barrier material as recited in claim 13 wherein said straight weave reinforce cloth is present in each of said first and second layers in an amount of at least 40% by weight of said respective first and second layers.

15. A barrier material as recited in claim 11 wherein said filler material of said second layer is silica flour.

16. A barrier material as recited in claim 9 further including a plurality of ceramic tiles bonded to a top surface of said second layer to provide an impact resistant layer structured to permit repeated impacts without comprising the integrity of said first and second layers.

17. A method for providing barrier protection comprising the steps of:

a) providing a barrier material including a first layer formed of a flexible polyester resin in an amount of at least 40% of a total weight of said first layer and a woven fabric embedded therein, a second layer bonded to said first layer and including an epoxy based resin in an amount of at least 40% of the total weight of said second layer and a woven fabric embedded therein, wherein said second layer has a hardness when cured which is greater than a hardness of said first layer when cured, and wherein the shear bond strength of the barrier material is at least equal to the shear bond strength of a similar single matrix laminate comprising first and second layers of the same matrix material b) receiving an impact of an object or projectile on an outer surface of said second layer, c) increasing a surface area of the impacting object or projectile relative to a plane of said first and second layers, d) increasing an amount of resistance to penetration of the impacting object or projectile relative to said barrier material, e) causing the impacting object or projectile to decelerate, and f) stopping the object or projectile prior to the object or projectile penetrating completely through said second layer.

\* \* \* \* \*